United States Patent
Kim et al.

(10) Patent No.: US 7,217,436 B2
(45) Date of Patent: May 15, 2007

(54) METHOD FOR PREPARING GERMINATED BROWN RICE HAVING IMPROVED TEXTURE AND COOKABILITY WITHOUT MICROBIAL CONTAMINATION AND A GERMINATED BROWN RICE OBTAINED THEREFROM

(75) Inventors: Sang-You Kim, Pusan (KR); Hyun-Jun Park, Pusan (KR); Sang-Jin Byun, Taegu (KR)

(73) Assignee: CJ Corp., Seoul (KR)

( * ) Notice: Subject to any disclaimer, the term of this patent is extended or adjusted under 35 U.S.C. 154(b) by 565 days.

(21) Appl. No.: 10/718,943

(22) Filed: Nov. 21, 2003

(65) Prior Publication Data

US 2004/0105921 A1  Jun. 3, 2004

(30) Foreign Application Priority Data

Nov. 27, 2002  (KR) .................. 10-2002-0074299

(51) Int. Cl.
*A23L 1/015* (2006.01)
*A23L 1/182* (2006.01)
(52) U.S. Cl. .................... 426/618; 426/321; 426/392; 426/397; 426/443; 426/479; 426/507; 426/508; 426/520; 426/523; 426/524
(58) Field of Classification Search ............ 426/321, 426/618, 392, 397, 443, 479, 507, 508, 520, 426/523, 524
See application file for complete search history.

(56) References Cited

U.S. PATENT DOCUMENTS

2002/0182288 A1*  12/2002  Kanehiro et al. ............. 426/49
2004/0052924 A1*   3/2004  Kimura ....................... 426/626

FOREIGN PATENT DOCUMENTS

| KR | 1019980001373 | 1/1998 |
| KR | 2019990029435 | 12/1999 |
| KR | 1020000018259 | 4/2000 |
| KR | 1020010011199 | 3/2001 |
| KR | 1020010031297 | 6/2001 |

* cited by examiner

*Primary Examiner*—Helen Pratt
(74) *Attorney, Agent, or Firm*—Lowe Hauptman & Berner LLP

(57) ABSTRACT

The present invention relates to a method for preparing germinated brown rice that has better texture, is easier to cook and has higher safety from microbial contamination compared with conventional germinated brown rice, by controlling the conditions for the germination process, and to a germinated brown rice obtained therefrom. More particularly, improved germinated brown rice can be obtained by at least partially removing the skin, germinating the altered rice in slighted acid germination water and treating the germinated brown rice at elevated temperatures and pressures.

6 Claims, 2 Drawing Sheets

METHOD FOR PREPARING GERMINATED BROWN RICE HAVING IMPROVED TEXTURE AND COOKABILITY WITHOUT MICROBIAL CONTAMINATION AND A GERMINATED BROWN RICE OBTAINED THEREFROM

BACKGROUND

1. Field of the Invention

The present invention relates to a method for preparing germinated brown rice having improved texture, cookability without microbial contamination and to a germinated brown rice obtained therefrom. More specifically, the present invention relates to a method for preparing germinated brown rice that has better texture, is easier to cook at homes and has higher safety from microbial contamination compared with conventional germinated brown rice, by controlling the conditions for the germination process, and to a germinated brown rice obtained therefrom.

2. Discussion of Related Art

The structure of brown rice consists, from the topmost layer, of the rice bran layer that comprises three layers such as pericarp, testa and aleurone layer, and the embryo occupying a small portion of the base of the rice grain, and the endosperm occupying most of the remaining part. This endosperm, which is filled dominantly with starch, is the edible rice portion.

Compared with milled rice, unpolished brown rice is stable in storage and less susceptible of being damaged by insects or microbes, and does not lose in much nutrients. Therefore, it is rich in fats, proteins, vitamins $B_1$ and $B_2$ compared with milled rice, and does not undergo reduction in the quantity owing to processing. However, in spite of these benefits aspects of brown rice, it is not widely popular because it is less tasty than milled rice, its nutritious ingredients are not sufficiently digested and assimilated, and it is not easy to cook. Consequently, germinated brown rice is drawing more interest.

Germinated brown rice results from germination of the embryo of brown rice through various physiological changes within the rice grain under conditions suitable for germination. Compared with conventional brown rice, germinated brown rice is effectively digested and assimilated in the body, and it is recognized as a functional food with high contents of nutrients beneficial to the human body, such as γ-aminobutyric acid (referred to as GABA), ferulic acid, diet fiber and the like.

However, germinated brown rice has problems of producing offensive fermentation smell and bad odor during the germination process because of the metabolism of brown rice itself as well as the growth of microbes that are attached to the surface of the grain, and undergoing putrefaction during the germination process. Thus, these problems occurring in the germination process should be avoided for the preparation of high quality germinated brown rice. The aforementioned problems should be necessarily recognized in order to satisfy the demand of consumers, and in fact quality control of germinated brown rice through controlling various conditions in the process for preparing germinated brown rice is required.

According to the results of many researches on germinated brown rice, it is reported that as brown rice undergoes germination, its texture becomes soft to a certain extent owing to the physiological activity of brown rice itself and activities of various enzymes, and thereby preparation of a rice which is very easy to cook and has soft texture, compared with normal brown rice, is possible. However, practically there is limit in overcoming such dissatisfaction on conventional brown rice only by adopting the germination process, and the product quality is much too low to satisfy the fastidious demand of consumers. Thus, techniques such as follows are being introduced as a result of researches to improve various properties of brown rice (e.g., texture, cookability, etc.).

Korean Patent No. 247686 discloses a method for making germinated brown rice wherein rice grains still covered with the husks are immersed in brine to sort out those grains with high germinating potential, and then these selected rice grains are partially polished to brown rice, which are subjected to processes of germinating in water and germinating in air repeatedly.

Korean Patent Publication No. 2000-37091 describes a germinating apparatus for repeating the germination process comprising the steps of washing brown rice while circulating water in the germination bath, germinating brown rice in water, discharging water from the germination bath regularly while germination, and injecting air into the bath by an air injection motor.

Korean Patent Publication No. 2002-71208 discloses a device for drying germinated brown rice rapidly to a water content of 25 to 42%, and a method for drying and packaging germinated brown rice comprising the step of drying of germinated brown rice followed by heat treatment. This patent discloses data on the improvement of the cookability of brown rice at homes.

Korean Utility Model Publication No. 2000-07517 discloses an electric heater for the preparation of edible germinated brown rice, which is used to cook brown rice.

Korean Patent Publication No. 2001-111002 discloses a method for preparing germinated brown rice having good cookability, texture and preserving property, wherein germinated brown rice prepared by controlling the water content, degree of gelatinization and the efficiency of water absorption during immersion in water, is subjected to steaming or moist heating, followed by drying.

However, in spite of aforementioned various techniques, there has been a continued desire to improve the quality of the geminated brown rice because the techniques could not resolve completely the problems such as the prolonged process of germination, prolonged cooking and inconvenience in cooking, the rough texture and abnormal odor of brown rice remained after cooking.

In this regard, the inventors of the present invention have conducted researches to solve the technical problems in quality and preparation process that conventional germinated brown rice products have and to develop a high-quality germinated brown rice which has high safety against microbial contamination, highly nutritious, and easy to cook at homes, and found that the texture of germinated brown rice can be improved by lightly grinding brown rice to partially remove its outermost skin, putrefaction of germinated brown rice can be prevented and its abnormal odor can be removed through controlling appropriately the germination conditions such as pH and temperature of the germination water, air injection, change interval of the germination water and so on, and treatment of germinated brown rice under high temperature and high pressure can lead to the improvement of the safety against microbial contamination and cookability as well as further improvement of the texture of brown rice.

Therefore, the object of the present invention is to provide a method for preparing germinated brown rice that has high safety against microbial contamination, highly nutritious, easy to cook at homes and soft in texture after cooking.

Another object of the invention is to provide a germinated brown rice prepared by the method according to the present invention.

SUMMARY OF THE INVENTION

The present invention is directed to a method for preparation of germinated brown rice having excellent texture, cookability and safety against microbial contamination, characterized in that comprises the steps of: grinding brown rice to an after-grinding weight level of 94.4% to 98.8% by weight based on the weight of raw brown rice in order to partially remove the outermost skin of brown rice; germinating brown rice by immersing grinded brown rice into slightly acidic germination water, injecting air therein and changing the germination water at an interval of 5 to 10 hours for a time period of 10 to 30 hours; and treating germinated brown rice at a high temperature of 100 to 140° C. and high pressure for 5 to 40 minutes.

The germination water used in the germinating step preferably has a pH value of 3 to 7 and a temperature of 20 to 50° C.

In the step of treatment under high temperature and high pressure, germinated brown rice is washed with water, packaged with sealing, subjected to high temperature and high pressure and then rapidly cooled. In this case, the final water content of germinated brown rice is at a level of 32 to 40% by weight.

Subsequently, germinated brown rice treated under high temperature and high pressure is dried at a temperature of 40 to 70° C. to achieve the final water content at a level of 10 to 20% by weight, in order to allow convenient distribution and to facilitate use of the product at homes.

One aspect of the present invention is to provide a germinated brown rice having improved texture, cookability and safety against microbial contamination prepared by grinding brown rice to partially remove its outermost skin, germinating brown rice by immersing grinded brown rice into slightly acidic germination water, injecting air therein and changing the germination water at regular intervals, and treating germinated brown rice under high temperature and high pressure.

Figure 1:
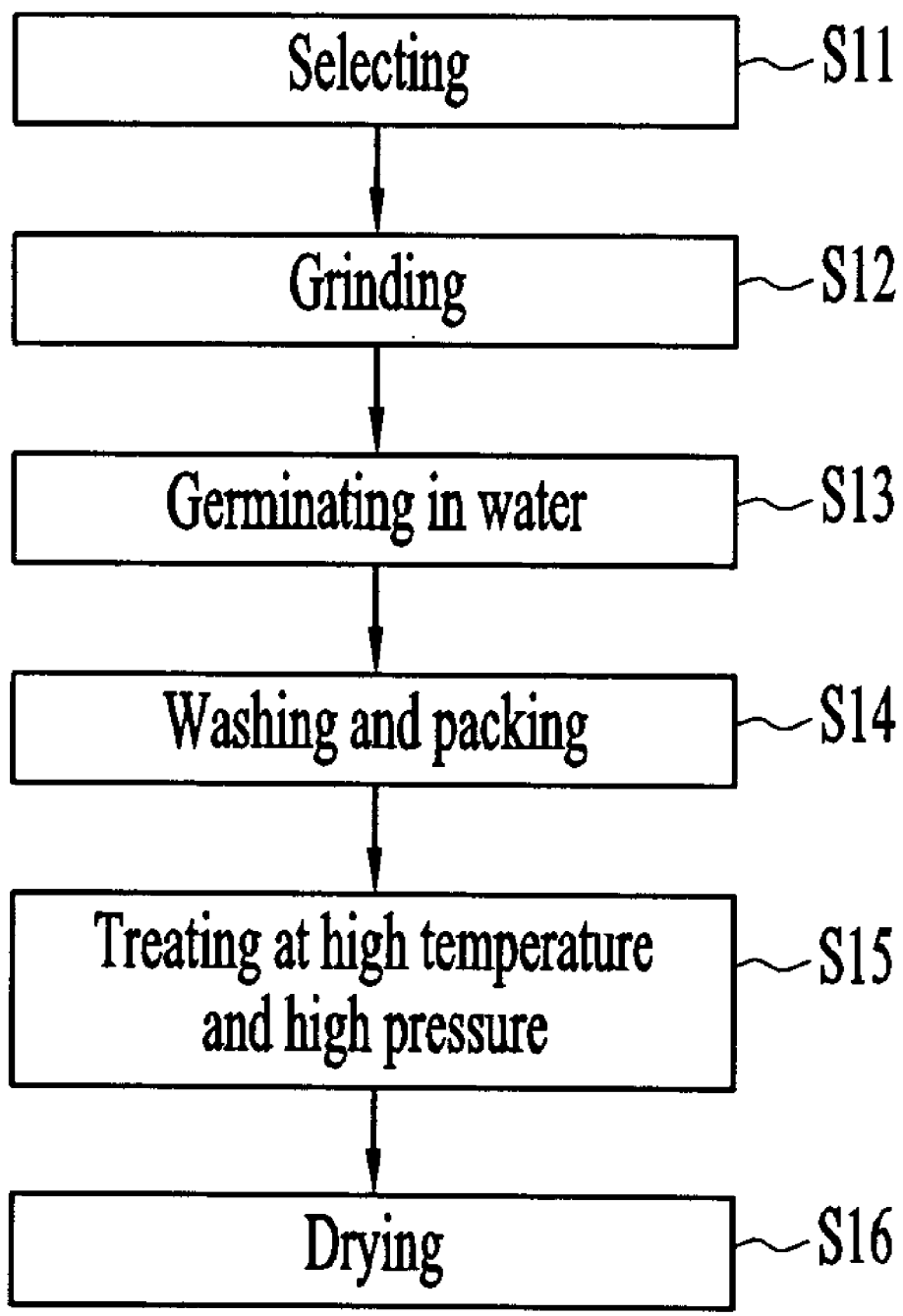
FIG. 1 shows the process flow for preparation of germinated brown rice according to a preferred embodiment of the present invention.

Hereinafter, the present invention is explained in more detail referring to the drawings.

DETAILED DESCRIPTION OF PREFERRED EMBODIMENTS

Referring to FIG. 1, the method for preparation of germinated brown rice according to the present invention may start from the step of selecting impurities from brown rice (S11), an optional step. Subsequently, the step of grinding selected brown rice (S12) is carried out. The grinding step herein means the process of partially removing the outermost skin of brown rice. The weight of brown rice after-grinding is in the range 94.4% to 98.8%, and preferably 96% to 98.8% based on the weigh of raw brown rice. Grinding of brown rice to a certain level in the present invention are carried out for the following reasons.

If brown rice is not grinded or is grinded to a level below the said range, the texture of cooked rice becomes rough and hard so that it is difficult to eat, and the brown rice needs a long time for swelling before cooking, thus it makes to cook at home undesirable. On the other hand, excessive grinding to a level over said range would lead to the removal of the embryo of brown rice and consequent loss of the function as germinated brown rice, making it undesirable. Ultimately, by grinding brown rice to a level of 94.4%–98.8% by weight based on the weight of raw brown rice, it is possible to protect the embryo that is essential in germination and to produce brown rice having soft texture without losing the functions beneficial to the human body imparted by many nutrients.

The grinding step (S12) is followed by a germinating step (S13). In the preparation process of germinated brown rice, since sufficient water absorbing brown rice is generally maintained at a constant temperature for a long time during the germinating step, the preservation property worsen due to microbial growth, and the problems of putrefaction and abnormal odor of brown rice may occur during the germinating step. Therefore, it is important to set the conditions in the germinating step (S13) to prevent above-mentioned problems. In the germinating step (S13) of the present invention, grinded brown rice is immersed into the germination bath which is filled with the slightly acidic germination water at a temperature of 20 to 50° C. for 10 to 30 hours, while injecting air into the germination bath through the air injection device installed in the lower part of the bath, thereby preventing the putrefaction of brown rice during the germinating step (S13). Further, the used germination water is replaced automatically and regularly at a time interval of 5 to 10 hours to prevent abnormal tasting and smelling of germinated brown rice. More preferred conditions for germination are such that the germination water is replaced regularly while injecting air for 15 to 30 hours at a temperature of 25 to 45° C., with the pH of the germination water being between 3 and 7.

In other words, among the conditions for germination as described above, if the pH of germination water is value of below 3 namely strongly acidic, the germination of brown rice is inhibited, thereby the contents of nutrients such as GABA and so on produced therein being reduced, and also the softening of the texture of brown rice becomes weakened by insufficient germination. Meanwhile, a pH value of 7 or higher of the germination water is not preferable because brown rice may putrefy during germination.

When the time for germination is shorter than 10 hours, the improvement of nutrients and texture of brown rice is not sufficient because germination cannot fully occur. When the time for germination is longer than 30 hours, it is not preferable because excessive germination results in lowered the contents of nutrients other than the diet fiber, excessively grown sprout makes the appearance of brown rice undesirable, and the production efficiency is lowered. If the temperature for germination is lower than 20° C., it will take long time to reach the desired level of germination. On the other hand, if the temperature is higher than 50° C., the rice may undesirably putrefy.

Therefore, germination of brown rice under the conditions for germination according to the present invention makes it possible to prepare a germinated brown rice of good quality efficiently in a short period of time by suppressing the generation of the undesirable putrefaction odor during germination, which may cause problem in product quality, and further the germination process leads to an increase in the contents of the various nutrients present in brown rice that are beneficial to human.

The germinated brown rice according to germinating step (S13) of the present invention is washed with clean water and is subjected to the step of packaging with tight sealing (S14), prior to the treatment under high temperature and high pressure. The germinated brown rice that has been washed and packaged then goes through the step of treating the rice under high temperature and high pressure (S15). Specifically, the step of treating under high temperature and high pressure (S15) is carried out by heat treating the washed and packaged brown rice at a temperature of 100 to 140° C. for 5 to 40 minutes and then cooled the treated rice with cold water. More preferably, the treatment under high temperature and high pressure is carried out under the conditions of a temperature of 100 to 130° C. for 10 for 20 minutes. Said treatment is preferably carried out such as to obtain the $F_0$ value of 5 to 30. As a unit representing the degree of thermal sterilization of food, the F value indicates the thermal destruction time which, expressed in minutes, is the time taken to annihilate a specific microbe by heating at a pre-determined temperature. More particularly, as a unit representing the time in minutes to annihilate a specific microbe by heating at 121.1° C., the $F_0$ value indicates the thermal destruction time for the microbe when the z value (the temperature increment required to reduce the heating time to one tenth, which time is required to reduce the number of the microbe to one tenth) is 10 at the heating temperature of 121.1° C.

If the treating temperature or time for the above-mentioned step (15) are lower and shorter, respectively, than the said range, the starch in the germinated brown rice does not gelatinize sufficiently, and thus the texture quality as well as the effect of destroying microbes are undesirably lowered. On the other hand, if the treating temperature and time are higher and longer, respectively, than the said range, gelatinization of the starch in the brown rice occurs excessively, thereby undesirably lowering the quality of the germinated brown rice to a large extent.

Moreover, examples of the equipment that may be used in the step of the treatment under high temperature and high pressure of the present invention are retort, autoclave and the like which are commonly used in heat treatment of processed foods. As the starch in the germinated brown rice is gelatinized through the treatment under high temperature and high pressure, the texture of the rice is soften, and destruction of the microbes that once increased during germination allows assurance of safety from microbial contamination. Subsequently, it is preferable to rapidly cooling the heat-treated germinated brown rice in order to prevent deterioration of the product.

The final water content of the germinated brown rice that has been treated under high temperature and high pressure becomes 32 to 40% by weight. Then, the germinated brown rice having the water content within said range is subjected to the drying step (S16), and this drying step (S16) is carried out by removing the packaging from the germinated brown rice previously treated under high temperature and high pressure and drying the rice in a dryer at a temperature ranging from 40 to 70° C. to obtain the final water content at a level of 10 to 20% by weight. Here, if the water content is lower than 10% by weight, individual grains of the germinated brown rice tend to form cracks or break in pieces, thus causing the damaged savor of the cooked germinated brown rice. On the other hand, if the water content exceeds 20% by weight, there occur problems microbes such as fungi, bacteria or the like readily grow, and preservation property deteriorates. Hence, appropriate drying process allows obtaining convenience in transportation and usage as well as assuring safety against secondary microbial contamination from small packages. The drying manner can be carried out by any one selected from those drying manners generally used in this field, for example, but not limited to, convectional drying, radiation drying, indirect drying, homogeneous heating by microwaves, vacuum drying or freeze drying.

For the preparation of germinated brown rice as described above, either non-glutinous rice or glutinous rice can be used.

The germinated brown rice prepared according to the above-described process has high contents and excellent composition of nutrients, does not produce the abnormal odor and the putrefaction odor caused by germination, and is safe from microbial contamination. Further, this germinated brown rice can be easily cooked at homes, and its texture is superior to that of conventional brown rice.

The germinated brown rice according to the present invention may be marketed in sealed packages in specific quantities, and it is also preferable to enclose packets of deoxygenating agent within the sealed packages in order to enhance safety of the product.

Further, the germinated brown rice may be cooked alone or in combination with polished rice, or may be used as the raw material for processed foods such as rice cookies, powdered cereal, uncooked cereal, porridge or bread.

In addition, if necessary, the germinated brown rice can be coated or treated by other appropriate manner such as absorption with a variety of functional ingredients in order to reinforce the nutriment of the brown rice.

The present invention will be explained in more detail through the Examples below. The Examples are presented only to illustrate the preferred embodiments of the present invention and not intended in any way to limit the scope of the present invention

EXAMPLE 1

Non-glutinous brown rice was grinded to the level of 98.8 wt % based on the weight of raw brown rice, and then the brown rice was immersed into germination water of pH 6 at 40° C. filled within a germination bath. After immersion, while air was injected through the air injection line installed in the lower part of the germination bath, the brown rice was germinated for 20 hours with changing the germination water twice at an interval of 7 hours. The germinated brown rice obtained from the germinating step was washed with clean water and packaged with sealing, and then the rice was treated under high pressure at a temperature of 121° C. for 20 minutes by injecting steam to the jacket of the autoclave. After that, the brown rice was rapidly cooled with cold water. Subsequently, the germinated brown rice obtained from the step of treatment under high temperature and high pressure was dried, using hot air at 60° C., to the final water content of 15% by weight.

EXAMPLE 2

Non-glutinous brown rice was grinded to the level of 98.8 wt % based on the weight of raw brown rice, and then the brown rice was immersed into germination water of pH 6 at 40° C. filled within the germination bath. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the rice was treated under high pressure at a temperature of 121° C. for 20 minutes by injecting steam to the jacket of the autoclave. Subsequently, the brown rice was rapidly cooled with cold water to produce a germinated brown rice product having the water content of 34% by weight.

EXAMPLE 3

Non-glutinous brown rice was grinded to the level of 97.6 wt % based on the weight of raw brown rice, and then the brown rice was immersed into germination water of pH 6 at 40° filled within the germination bath C. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the rice was treated under high pressure at a temperature of 121° C. for 20 minutes by injecting steam to the jacket of the autoclave. After that, the brown rice was rapidly cooled with cold water. Subsequently, the germinated brown rice obtained from the step of treatment under high temperature and high pressure was dried, using hot air at 60° C., to the final water content of 15% by weight.

EXAMPLE 4

Non-glutinous brown rice was grinded to the level of 97.6 wt % based on the weight of raw brown rice, and then the brown rice was immersed into germination water of pH 6 at 40° C. filled within the germination bath. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the rice was treated under pressure at a temperature of 121° C. for 20 minutes by injecting steam to the jacket of the autoclave. Subsequently, the brown rice was rapidly cooled with cold water to produce germinated brown rice product having the water content of 34% by weight.

EXAMPLE 5

Glutinous brown rice was grinded to the level of 98.8 wt % based on the weight of raw brown rice, and then the brown rice was immersed into germination water of pH 6 at 40° C. filled within the germination bath. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the rice was treated under high pressure at a temperature of 121° C. for 20 minutes by injecting steam to the jacket of the autoclave. After that, the brown rice was rapidly cooled with cold water. Subsequently, the germinated brown rice obtained from the step of treatment under high temperature and high pressure was dried, using hot air at 60° C., to the final water content of 15% by weight.

EXAMPLE 6

Glutinous brown rice was grinded to the level of 98.8 wt % based on the weight of raw brown rice, and then the brown rice was immersed into germination water of pH 6 at 40° C. filled within the germination bath. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the rice was treated under high pressure at a temperature of 121° C. for 20 minutes by injecting steam to the jacket of the autoclave. Subsequently, the brown rice was rapidly cooled with cold water to produce germinated brown rice product having the water content of 38% by weight.

EXAMPLE 7

Glutinous brown rice was grinded to the level of 96.8 wt % based on the weight of raw brown rice, and then the brown rice was immersed into germination water of pH 6 at 40° C. filled within the germination bath. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the was treated under high pressure out at a temperature of 121° C. for 20 minutes by injecting steam to the jacket of the autoclave. After that, the brown rice was rapidly cooled with cold water. Subsequently, the germinated brown rice obtained from the step of treatment under high temperature and high pressure was dried, using hot air at 60° C., to the final water content of 15% by weight.

EXAMPLE 8

Glutinous brown rice was grinded to the level of 96.8 wt % based on the weight of raw brown rice, and then the brown rice was immersed into germination water of pH 6 at 40° C. filled within the germination bath. After immersion, while air was injected through the air injection line installed in the lower part of the germination bath, the brown rice was germinated for 20 hours with changing the germination water twice at an interval of 8 hours. The germinated brown rice obtained from the germinating step was washed with clean water and packaged with sealing, and then the rice was treated under high pressure at a temperature of 121° C. for 20 minutes by injecting steam to the jacket of the autoclave. Subsequently, the brown rice was rapidly cooled with cold water to produce germinated brown rice product having the water content of 37.5% by weight.

Evaluation

The germinated brown rice obtained from the above Examples was compared with milled rice or normal brown rice and evaluated with respect to the nutrition, safety against microbes, texture and other properties. The results are summarized in Tables 1 to 4 below.

Evaluation on Nutrition

Analyses for the nutrients and their compositions of the germinated brown rice obtained from Examples 1 and 2 and of normal polished rice were made by the Korea Health Industry Development Institute (KHIDI), and the results are presented in Table 1 below.

TABLE 1

| Component | Example 1 | Example 2 | Milled rice |
|---|---|---|---|
| Ash (%) | 0.4 | 0.5 | 0.4 |
| Crude Fat (%) | 2.0 | 2.3 | 0.6 |
| Crude Protein (%) | 5.3 | 5.4 | 5.0 |
| Vitamin E (mg/100 g) | 0.4 | 0.3 | 0.1 |
| Carbohydrate (%) | 59.1 | 70.2 | 72.1 |
| Calories (Kcal) | 267.2 | 313.4 | 310.7 |
| Iron (%) | 0.6 | 0.7 | 0.0 |
| Phosphorus (mg/100 g) | 101.3 | 111.5 | 70.2 |
| Magnesium (mg/100 g) | 30.7 | 38.4 | 15.5 |
| Calcium (mg/100 g) | 8.5 | 8.2 | 4.0 |
| Sodium (mg/100 g) | 6.9 | 3.2 | 4.0 |
| Total Diet Fiber (%) | 2.2 | 2.4 | 0.8 |
| γ-oryzanol (mg/100 g) | 15.9 | 23.1 | 1.2 |
| Potassium | 49.3 | 59.7 | 61.7 |

(The water contents of the sample rice are 15%)

As shown in Table 1 above, the germinated brown rice of Examples 1 and 2 according to the present invention contains more beneficial nutrients in large quantities compared with milled rice.

Evaluation on the Safety Against Microbes

The brown rice which was subjected to the processes of grinding, germinating and treating under high temperature and high pressure according to the present invention in Example 1 above, and untreated normal brown rice were investigated for microbial contamination, and the results are presented in Table 2 below.

The evaluation on safety against microbes was performed according to the counting method for bacteria (general bacteria) and fungi (yeast and filamentous fungus) among the microbial testing methods suggested in the Food Code (Korea Foods Industry Association).

TABLE 2

| | General bacteria | Yeast/Fungi | Remarks |
|---|---|---|---|
| Before germination | $4 \times 10^5$ | $1.7 \times 10^3$ | |
| After treatment under high temperature and pressure | 0 | 0 | |

As shown in Table 2 above, after the treatment under high temperature and high pressure, any of general bacteria and yeast/fungi were not found, and this implies that the conditions for the treatment under high temperature and high pressure according to the present invention are suitable for assuring safety against microbes.

Evaluation on Texture

The germinated brown rice of Examples 1 and 2, and as the objects for comparison, ungerminated brown rice, a Korean germinated brown rice (Chang Se-Soon Taecho™ germinated brown rice products) and a foreign germinated brown rice were evaluated for the texture after cooking, and the evaluation was carried out by performing the Two Bite Test with a texture profile analyzer, with the terms for the texture being divided into hardness, fracturability, adhesiveness, gumminess and chewiness. The analysis results are presented in Table 3 and in FIG. 2 as a graph.

TABLE 3

| | hardness | fracturability | adhesiveness | gumminess | chewiness |
|---|---|---|---|---|---|
| Example 1 | 817.9 | 965.7 | −20.0 | 0.28 | 618.7 |
| Example 2 | 316.1 | 391.2 | −23.3 | 0.27 | 62.4 |
| Ungerminated brown rice | 1374.5 | 1541.5 | −22.1 | 0.34 | 728.7 |
| Foreign germinated brown rice | 974.5 | 902.9 | −23.1 | 0.34 | 925.5 |
| Korean germinated brown rice[*1] | 1060.5 | 1164.0 | −20.0 | 0.29 | 650.0 |

[*1]Chang Se-SoonTaecho ™ geminated brown rice product)

Figure 2:
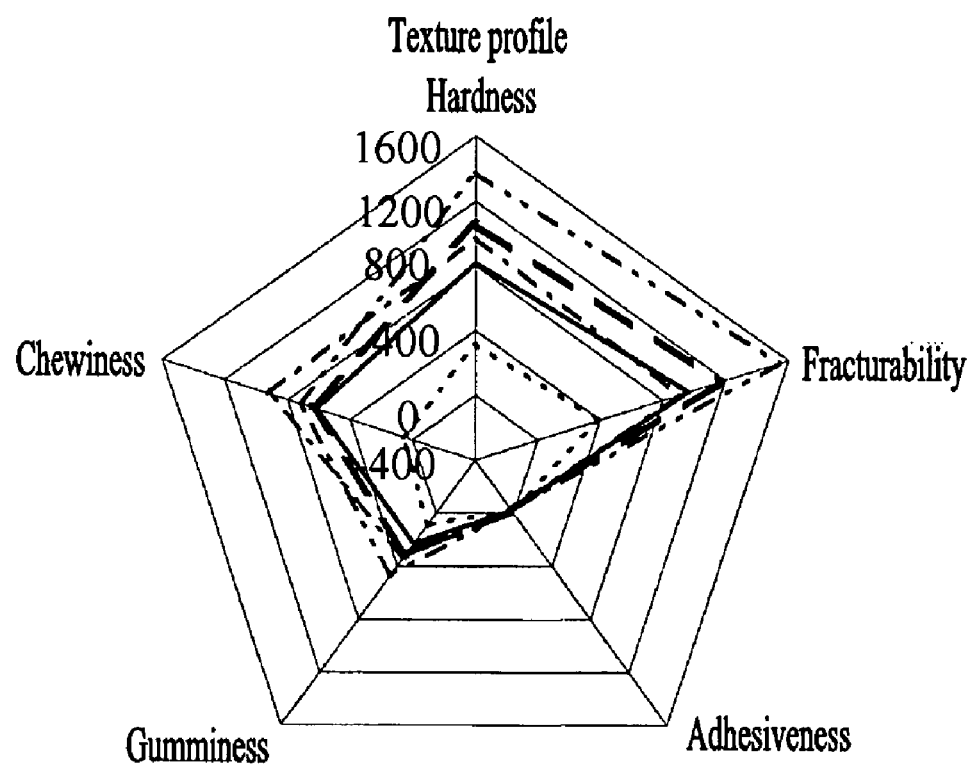
FIG. 2 shows the texture of the brown rice prepared according to the present invention compared with that of conventional brown rice.
Figure 2:
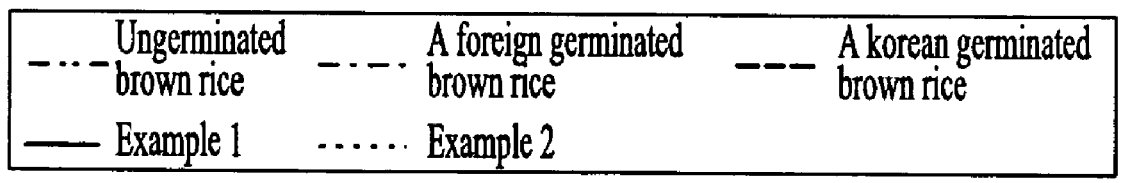

As shown in Table 3 and FIG. 2, the germinated brown rice of Examples 1 and 2 according to the present invention were superiorly mitigated in hardness compared with the ungerminated brown rice or other germinated brown rice. Similarly, the germinated brown rice according to the present invention was also superior or similar to the other testing objects in fracturability, adhesiveness, gumminess and chewiness. This implies that the germinated brown rice according to the present invention is of superior quality in overall.

Evaluation on Quality

A large-scale consumer survey (250 persons in each group) was conducted with respect to the cooked rice prepared with a 50:50 mixture of the germinated brown rice of Example 1 and polished rice, to investigate the product quality. The quality investigation was carried out using the five-point grading method. The cooked rice for comparison was prepared with a 50:50 mixture of Korean germinated brown rice and polished ice.

TABLE 4

| Evaluation Terms | 50% of germinated brown rice of Example 1 | 50% of Korean germinated brown rice |
|---|---|---|
| Savor in general | 3.78 | 2.87 |
| Texture on mastication | 3.76 | 2.58 |
| Degree of tastiness | 3.69 | 3.46 |
| Odor of cooked rice | 3.45 | 2.85 |
| Aftertaste | 3.73 | 3.06 |
| Preference in glutinousness | 3.77 | 2.46 |
| Shape/state of rice grains | 3.64 | 2.99 |
| Degree of tasteful appearance | 3.68 | 2.75 |
| Degree of digestion/assimilation | 4.08 | 3.04 |
| Degree of masticability | 4.30 | 3.03 |
| Color in general | 3.54 | 2.75 |
| Preference in the degree of roughness | 3.60 | 2.45 |
| Degree of glossiness | 3.53 | 2.30 |

TABLE 4-continued

| Evaluation Terms | 50% of germinated brown rice of Example 1 | 50% of Korean germinated brown rice |
|---|---|---|
| Preference in the degree of thickness | 3.84 | 3.00 |

Therefore, the germinated brown rice according to the present invention has high contents of nutrients and excellent composition, does not produce abnormal odor and putrefaction odor due to germination, and has high safety from microbial contamination. Further, it is possible to cook conveniently using common rice cookers, without the need to wash/selecting, and also to prepare a germinated brown rice product having excellent texture compared with conventional brown rice.

What is claimed is:

1. A method for preparation of germinated brown rice having excellent texture, cookability and safety against microbial contamination, comprising the steps of:

grinding brown rice to a ground weight level ranging from 94.4% to 98.8% by weight based on the weight of raw brown rice in order to partially remove an outmost skin of the brown rice;

germinating the brown rice by immersing the ground brown rice into acidic germination water for a time period ranging from 10 to 30 hours, injecting air therein throughout the time period and changing the germination water at a use interval ranging from 5 to 10 hours; and treating the germinated brown rice at a high temperature ranging from 100 to 140° C. and under a predetermined pressure for a time period of 5 to 40 minutes.

2. The method for preparation of germinated brown rice according to claim 1, wherein the germination water used in the germination step has a pH value of 3 to 7 and a temperature ranging from 20 to 50° C.

3. The method for preparation of germinated brown rice according to claim 1, wherein treating the germinated brown rice at high temperature and under a predetermined pressure further comprises washing the germinated brown rice with water and packaging the rice with sealing prior to treating the brown rice under high temperature and under a predetermined pressure, and cooling rapidly the treated brown rice.

4. The method for preparation of germinated brown rice according to claim 1, wherein a final water content of the germinated brown rice after the treatment under high temperature and predetermined pressure is at a level in the range of 32 to 40% by weight.

5. The method for preparation of germinated brown rice according to claim 1, further comprising the step of drying the germinated brown rice, after treating at high temperature and a predetermined pressure, at a temperature ranging from 40 to 70° C. to obtain a final water content at a level of 10 to 20% by weight.

6. The germinated brown rice prepared according to any one of claims 1 to 5.

* * * * *